UNITED STATES PATENT OFFICE.

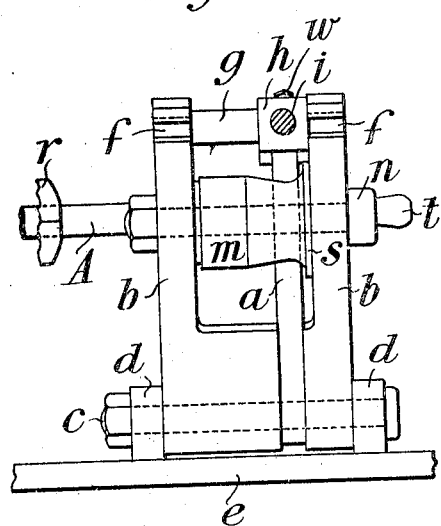
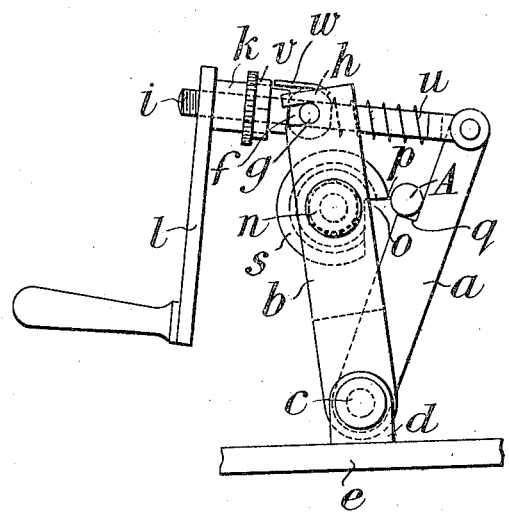
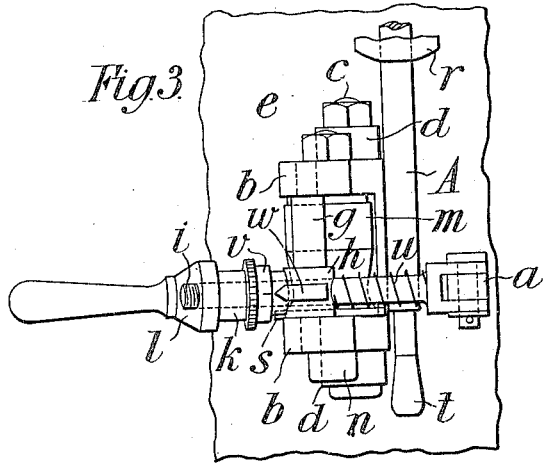

GILBERT PAWSON, OF KENSINGTON GORE, LONDON, ENGLAND.

TURNING-TOOL.

1,317,311.   Specification of Letters Patent.   Patented Sept. 30, 1919.

Application filed May 27, 1918. Serial No. 236,898.

*To all whom it may concern:*

Be it known that I, GILBERT PAWSON, a subject of the King of Great Britain, residing at Queens Gate Works, Kensington Gore, London, England, have invented a new and useful Improved Turning-Tool, of which the following is a specification.

My invention relates to a turning tool especially intended for the production from a rod or bar of a series of uniform articles, the said tool consisting essentially in the combination with a tool-holder of one or more steadying supports which is or are so mounted with relation to the tool that it is impossible for any improper movement of one with relation to the other taking place, while at the same time the combined tool-holder and support are mounted in such a manner that they are capable of moving in unison in case the bar from which the articles are being formed is not running true, whereby any malformation of the articles produced is avoided.

In a suitable arrangement for carrying out my invention I mount two frames or members pivotally upon a common spindle, in one of which the cutter is mounted, while the other constitutes the work support, and in conjunction with these frames or members I provide means for drawing them together during the cutting operation.

My invention will be readily understood by reference to the accompanying drawing, in which:—

Figure 1 is an end view of the improved tool,

Fig. 2 is a face view with certain parts removed; and,

Fig. 3 is a plan.

$a$, $b$ indicate the work supporting member and the tool carrying member, respectively, of the tool and $c$ the spindle upon which the same are pivoted, the said spindle being carried in supports $d$, $d$ fixed to a bed or plate $e$ which may be the bed of an ordinary lathe. As shown in the drawing the member $b$ is made in two sections which are arranged on the opposite sides of the member $a$, these two sections carrying in slots $f$ at their upper end a cross-head $g$, the said cross-head, as shown, being provided with an enlarged portion $h$. To the free end of the member $a$ is pivotally connected one end of a bolt $i$, the other end of which is screw-threaded and passed through a hole or eye in the enlarged part $h$ of the cross-head $g$, the screw-threaded portion of the said bolt, which projects beyond the eye, having upon it a nut $k$ provided with a wheel or handle $l$ in such a manner that the rotation of the latter will serve to draw the two frames or members $a$, $b$ toward one another.

$m$ indicates the cutter which is mounted upon a spindle or bolt $n$ between the sections of the member $b$. This cutter is of circular section and has its circumference shaped to correspond to the profile of the article to be turned, a notch or recess $o$ being formed longitudinally of the cutter, as shown in Fig. 1, to form the cutting edge $p$. $q$ indicates the lip or ledge formed in the member $a$ and upon which the bar A to be operated upon is supported during the turning operation, the position of the said lip or ledge being adapted to the diameter of the said bar, so that the latter is presented to the edge $p$ of the cutter in the proper position. As the parts of the member $a$ against which the bar A bears tend to wear away, they may be provided with renewable surfaces or with anti-friction rollers.

In practice my improved tool is used in connection with a driving headstock having a hollow mandrel or spindle through which the bar A is passed. In the drawing a part of a chuck or clamp for gripping the bar is indicated at $r$.

In using the tool it will be understood that the bar A is moved through the mandrel and its end laid upon the lip $q$, whereupon it is gripped by the chuck $r$ and the head-stock then started. As the bar A rotates the nut $k$ is turned by means of the handle $l$ so that the said bar and the cutter $m$ will be brought into contact. As the rotation of the nut $k$ is continued the cutter $m$ is fed toward the work A until the desired profile has been attained. The cutter $m$ has combined with it a flange $s$ forming a parting tool, which serves, as the said cutter is fed toward the bar A, to separate the portion thereof previously profiled. In the drawing this previously profiled part, is represented by the letter $t$, this part being, as before stated, severed from the bar as the adjacent part of the bar is being profiled.

A spring $u$ is preferably arranged between the two frames or members $a$, $b$, for instance, around the bolt $i$, for the purpose of separating the said frames when the tool is to be opened to allow the bar A to be fed forward. Stops may be provided for limiting the movement of the two frames with relation to one another in order to arrest the cut at any desired point; or, if desired, the nut $k$ may have a graduated ring $v$ upon it, arranged in conjunction with a pointer $w$, for allowing of rotating the said nut to any desired extent.

Instead of drawing the two members of the tool together by means of a screw, as described, it is to be understood that cams, levers or other means may be used for the purpose; also, instead of mounting the two members on a common pivot they may be mounted on separate pivots provided such pivots are rigid with relation to one another.

Claims:

1. In a turning tool the combination of two members mounted at one end upon a common spindle and at the other end connected by a bolt carrying a regulating nut, one of the said members being provided with a cutter while the other is formed with a lip or ledge forming a work support, whereby when the said nut is rotated the cutter will be fed toward the work, substantially as described.

2. In a turning tool, the combination of two members pivotally mounted at one end upon a common support, and at the other end connected by means for drawing the same together, one of said members being provided with a cutter while the other is formed with a lip forming a work support, whereby when the said connecting means is operated the cutter will be fed toward the work.

3. In a turning tool, a two-part member having one of its ends pivotally mounted upon a support, a cutting tool carried by said member, a work supporting member located between the two parts of the first member and having one of its ends pivotally mounted on said support, and means connecting the free ends of said members and constructed to move one of said members toward the other member.

4. A device of the class described comprising a spindle, a two-part member having one of its ends pivotally mounted on said spindle, a cutter carried by said member, a rod connecting the two parts of said member at their free ends, a work supporting member having one of its ends pivotally mounted upon said spindle, a bolt carried by the last named member and extending through said rod, and a nut engaging said bolt for moving the members toward each other.

5. A device of the kind described in claim 4 having a spring surrounding the bolt and bearing against the rod for moving the free ends of the members apart.

6. A device of the kind described in claim 1, in which the regulating nut is provided with indications and a pointer located adjacent the indications and coöperating with the same to indicate relative movements of the members.

GILBERT PAWSON.

Copies of this patent may be obtained for five cents each, by addressing the "Commissioner of Patents, Washington, D. C."